United States Patent [19]

Fukuhara

[11] Patent Number: 4,670,759

[45] Date of Patent: Jun. 2, 1987

[54] AUTOMATIC LORAN-C SIGNAL DETECTING APPARATUS

[75] Inventor: Hiroshige Fukuhara, Yokosuka, Japan

[73] Assignee: Nissan Motor Company, Ltd., Kanawaga, Japan

[21] Appl. No.: 601,677

[22] Filed: Apr. 18, 1984

[30] Foreign Application Priority Data

Apr. 26, 1983 [JP] Japan .................................. 58-72128

[51] Int. Cl.⁴ .......................... G01S 1/24; G01C 21/00
[52] U.S. Cl. ....................................... 342/389; 364/452
[58] Field of Search ...................... 343/388, 389, 390; 364/452

[56] References Cited

U.S. PATENT DOCUMENTS 4,166,275 8/1979 Michaels et al. ..................... 343/389
4,268,830 5/1981 Brodeur .

FOREIGN PATENT DOCUMENTS 55-2938 1/1980 Japan .
56-2312 1/1981 Japan .
57-44869 3/1982 Japan .
57-192880 11/1982 Japan .

OTHER PUBLICATIONS

O'Halloran et al., "Use of Loran-C in AVM and C² Systems," 1980 Carnahan Conference on Crime Countermeasures, University of Kentucky, May 14-16, 1980.

Primary Examiner—Theodore M. Blum
Assistant Examiner—Gregory C. Issing
Attorney, Agent, or Firm—Lowe, Price, LeBlanc, Becker & Shur

[57] ABSTRACT

An automatic Loran-C signal detecting apparatus samples a received signal at a constant high sampling frequency of which the Loran-C carrier frequency is a harmonic. The polarity of the sampled signal at each sampling frequency cycle is stored in a corresponding memory cell for every two successive periods of the Loran-C signal. All of memory cells are previously loaded with a value m. A control unit determines whether the polarity of the sampled signal is positive or negative and adds +1 to the value m of the memory cell when the sampled signal is positive and adds −1 to the value m of the memory cell when the sampled signal is non-positive. After a given number of Loran-C signal cycles, the accumulated polarity totals are compared to a range around the original value m to detect which memory cells, i.e. which sampling times, coincide with Loran-C pulses. The polarity of the Loran-C pulses thus detected can then be checked to identify the sending station of each group of Loran-C pulses.

8 Claims, 7 Drawing Figures

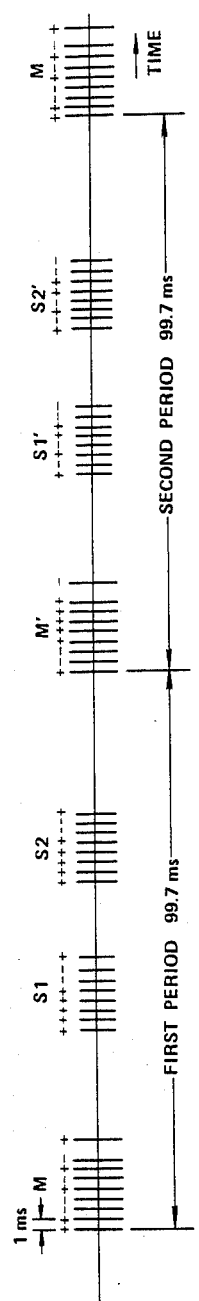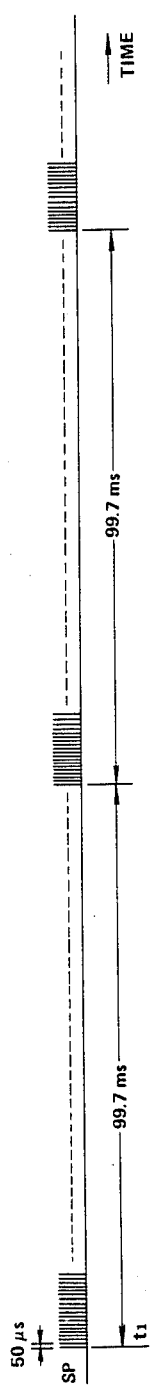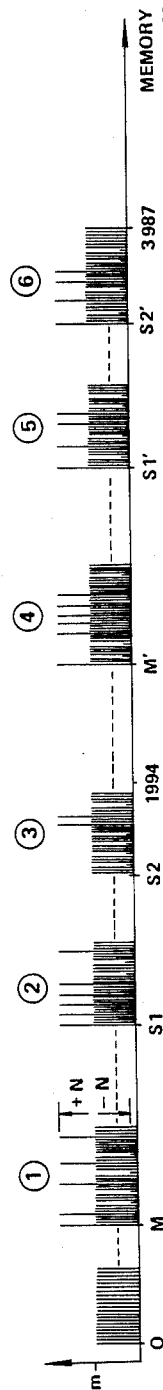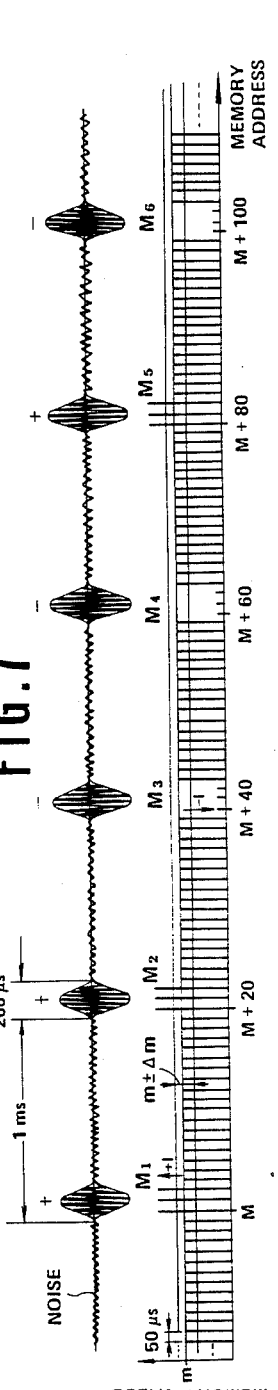
FIG.5
FIG.7

AUTOMATIC LORAN-C SIGNAL DETECTING APPARATUS

BACKGROUND OF THE INVENTION

The present invention relates to a radio navigation apparatus and more particularly to an apparatus for automatically detecting a Loran-C signal.

Conventionally, navigation techniques called "Loran-A" and "Loran-C" which use the principle of hyperbolic navigation are used by ships and airplanes to pinpoint their positions. A Loran-C signal receiver determines the time lag between arrivals of signal pulses from master and secondary transmission stations. Toward this end, the receiver produces a sampling pulse signal, the period of which is equal to the pulse repetition period of the Loran-C signal, the first, second and third sampling pulses having the same phase as the pulses from the master, first and second secondary stations, respectively, and measures the time interval between the first and the second or third pulses. Therefore, it is necessary for the sampling pulse produced in the receiver in a random phase relationship with the master, first and second station pulses to be synchronized with the width of the pulses of the Loran signal. The Loran-C signal receiver receives a pulse-modulated 100-KHz sinuosoidal signal and measures the phases relationships among the carrier waves of the master and secondary station signals in order to measure the time differences therebetween.

An unexamined Japanese patent application TOK-KAISHO No. 55-2938 of Haruo Kitamura published on Jan. 10, 1980 discloses an automatic pulse signal seeking apparatus.

As shown in FIG. 1 of the accompanying drawings, the apparatus detects a Loran-C pulse signal coming from master station. A Loran-C signal is received by an antenna 1, amplified by a high-frequency amplifier 2, gated by gates 3 and 4, held by hold units 5 and 6. A arithmetic operating unit 7 performs the arithmetic calculation $z=\sqrt{x^2+y^2}$ where x and y denote the outputs of hold units 5 and 6. A determiner 8 determines whether z is above a predetermined threshold value and outputs the result as a binary signal ("1" or "0"). A control unit 9 outputs a control signal depending on the output of determiner 8. An oscillator 10 generates a high-frequency clock pulse signal, the frequency of which is divided by a trigger generator 11 into a trigger pulse signal having a period equal to the period of the Loran-C signal pulses. The pulses of the trigger pulse signal are counted by a counter 12, the output of which controls a monostable multivibrator 14 which in turn provides a signal to a gate 15. A sampling pulse generator 13 produces sampling pulses in synchronism with the trigger pulse signal.

FIGS. 2(a) and 2(b) show the waveforms of signals produced by the major elements of the apparatus of FIG. 1. FIG. 2(b) is an enlargement of FIG. 2(a) where the waveform A shows the output of amplifier 2 and its envelope; the actual waveform consists of a 100-KHz carrier wave defining an envelope A by combination of its peak values. The waveforms B and C are sampling pulses inputted to gates 3 and 4, respectively, and in FIG. 2(a), the waveforms B and C are represented by a single common line segment. The waveform C is 2.5 $\mu$s later than waveform B and corresponds to a 90-degree phase interval of the 100-KHz sinuosoidal wave. Thus, given the 100-KHz sinuosoidal waveform K sin $(2\pi ft+\theta)$ and the phase $\theta_1$ of the waveform B, then the phase of the waveform C is $(\theta_1+\pi/2)$, and the outputs of gates 3 and 4 are $x=K \sin \theta_1$ and $y=K \cos \theta_1$, respectively. Therefore, the output of calculating device 7 is $z=\sqrt{x^2+y^2}=K$ which is the peak value of the carrier. The Loran-C pulse signal consists of 8 or 9 pulses generated at predetermined time intervals. The waveform A of FIG. 2A is a pulse signal transmitted by the master station which consists of 8 pulses separated by 1 ms and a last pulse separated by 2 ms from the preceding pulse.

As described above, the output of arithmetic operating unit 7 represents the peak value K of the carrier of the Loran-C pulse signal. If the waveforms B and C have the timing relationship with waveform A shown in FIG. 2(b), K is zero so that determiner 8 outputs a zero signal which indicates that the input to the determiner is not higher than a predetermined threshold value. A non-zero output from determiner 8 turns on gate 15 via control unit 9.

After a predetermined number of trigger pulses are sent by trigger generator 11 to counter 12, i.e., after a predetermined number of measurements of the signal have been performed at the same phase so that the measured result can be deemed reliable, counter 12 produces a pulse which triggers monostable multivibrator 14 which in turn produces a pulse after a time lag $T_1$ from the time of the triggering, thereby delaying the next generation of output pulses from trigger generator 11 by $T_1$ via gate 15. As a result, the waveforms B and C approach the waveform A by $T_1$. If this still leaves the input to determiner 8 below the predetermined threshold value, the waveforms B and C will be repeatedly delayed by $T_1$ until the waveforms B and C match the timing of waveform A in FIGS. 2(a) and 2(b). In this case, the input to determiner 8 exceeds the threshold value, so that control unit 9 turns gate 15 off, thereby ending detection of the Loran signal timing.

In such automatic Loran-C detecting apparata, the time lag $T_1$ by which the waveforms B and C are delayed must be shorter than the pulse width $\tau$ of envelope A. In addition, since $\tau$ is usually 200 $\mu$s and the repetition period of Loran-C pulses is 99.7 ms in Japan, which is much longer than $\tau$, it takes a very long time to shift waveforms B and C by time lag $T_1$ at a time until they match the timing of waveform A. For example, if $T_1$ is 100 $\mu$s, it could take as long as (99.7 ms/100 $\mu$s)×99.7 ms=9.9 seconds times the number of samples required for accuracy. Another problem is that in order for determiner 8 to detect the Loran signal, this signal must be greater than the predetermined threshold value and therefore a signal/noise (SN) ratio greater than a predetermined value must be ensured. When the Loran-C signal is received by vehicles, mountains, buildings, and overhead electrical cable for power transmission and communications could obstruct propagation and reception of the signals. In that case, the S/N ratio is often zero dB. Thus, this prior art apparatus is not suitable for a Loran-C signal detecting apparatus for a Loran-C signal receiver mounted on vehicles.

SUMMARY OF THE INVENTION

It is therefore an object of the present invention to provide a Loran-C signal detecting apparatus which detects a Loran-C signal accurately and quickly.

In order to attain this object, the received Loran-C signal is sampled at a high frequency over an interval equal to twice the pulse period. The Loran-C signal values are repeatedly sampled and stored for a predetermined number of Loran-C signal periods. The presence of the Loran-C signal is determined on the basis of the stored Loran-C signal values.

The above and other objects of the present invention will be apparent from the following description of a predetermined embodiment thereof, taken in conjunction with the accompanying drawings.

BRIEF DESCRIPTION OF THE DRAWINGS

In the drawings:

FIG. 5 is a timing chart of a Loran-C signal and a sampling pulse signal and a diagram of the resultant sampled signal values;

FIG. 7 enlarges the time scale of part of FIG. 5.

DETAILED DESCRIPTION OF THE PREFERRED EMBODIMENTS

Figure 1:
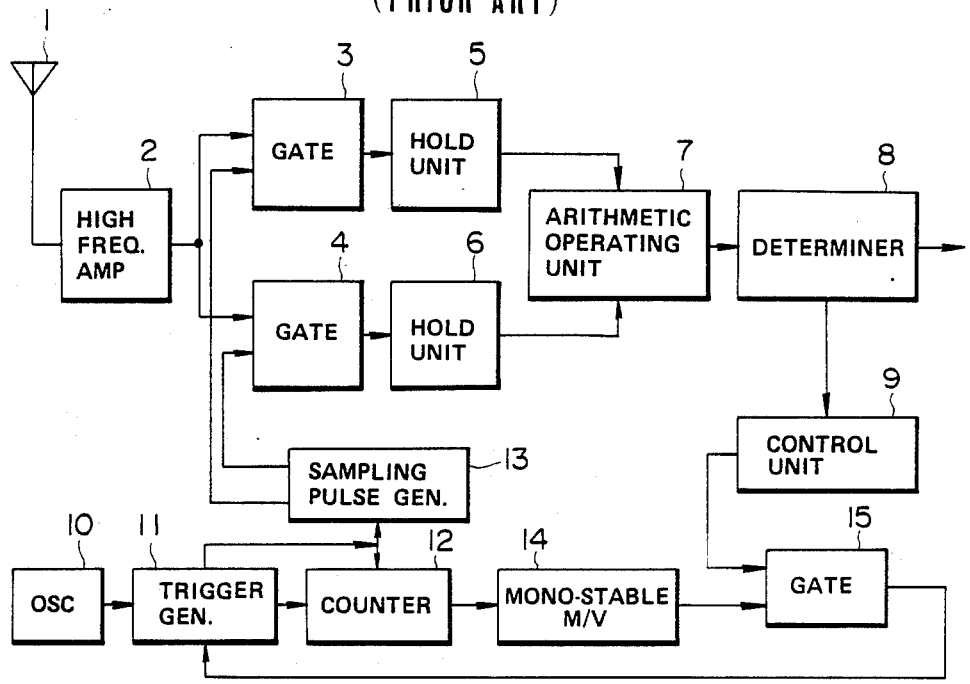
FIG. 1, as described above, is a block diagram of a prior art automatic Loran-C signal detecting apparatus.
Figure 2:
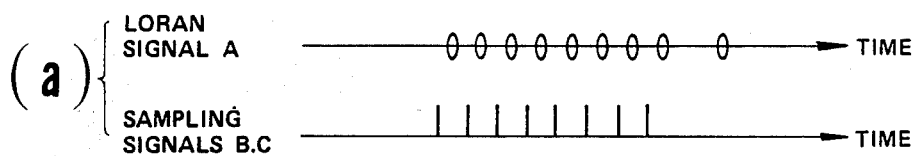
FIGS. 2(a) and 2(b), as described, are timing charts of a Loran-C signal and sampling pulse signals and the corresponding enlarged views thereof.
Figure 2:
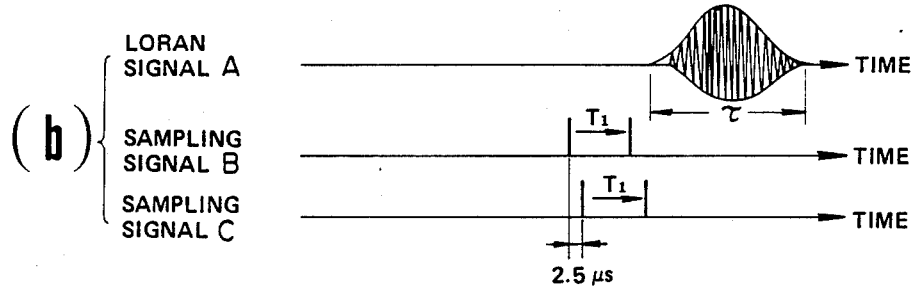
Figure 3:
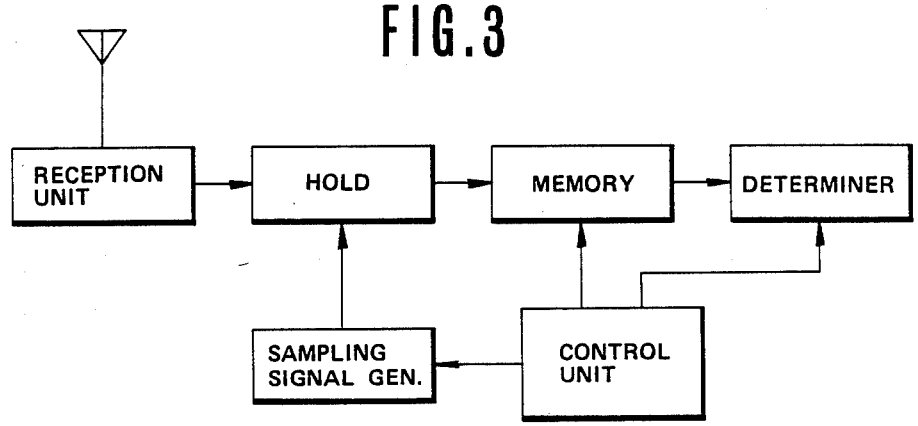
FIG. 3 is a basic block diagram of automatic Loran-C signal detecting apparatus according to the present invention.

Reference is made to FIG. 3 which illustrates the basic concept of an automatic Loran-C signal detecting apparatus according to the present invention. A Loran-C signal received via a reception unit is sampled synchronously with a fixed-period signal from sampling signal generating means. The sampled Loran-C signal information is held by a hold means such as a latch or buffer until it is stored in a corresponding cell of memory. One memory cell is allocated for each sample period over a predetermined number (in this case, 2) of Loran-C signal periods, i.e. periods of 99.7 ms. The values stored in the memory are processed by a determiner to determine the presence or absence of a Loran signal pulse. A control unit oversees the timing and operation of the memory and determiner in cooperation with the sampling signal generator.

Figure 4:
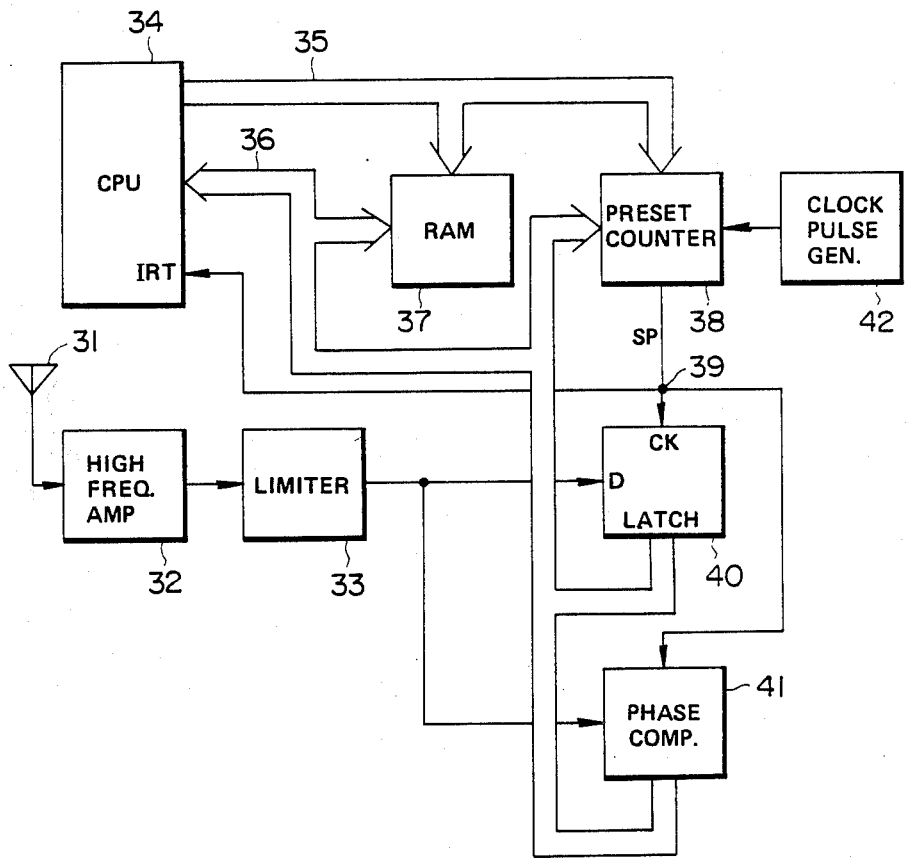
FIG. 4 is a more detailed block diagram of the apparatus of FIG. 3.

In FIG. 4, a Loran-C signal received via an antenna 31 is amplified by a high-frequency amplifier 32. The carrier wave of the amplified Loran-C signal is rectified and polarized into a digital signal by a limiter 33. Specifically, the binary output of limiter 33 has the value "1" when the Loran carrier wave has a positive polarity and has the value "0" when the carrier wave is non-positive.

A CPU (microprocessor) 34 stores this binary information about the sampled Loran-C signal in a RAM 37 via an address bus 35 and a data bus 36. CPU 34 also presets a count in a presettable counter 38 via bus 35. The output 39 of counter 38 is used as an interrupt request signal IRT to CPU 34 and a trigger signal to a latch 40 and a phase comparator 41. Latch 40 latches the binary information ("1" or "0") from limiter 33 in synchronism with the output 39 of counter 38 and outputs the latched information onto data bus 36. Phase comparator 41 compares the phases of the output of counter 38 and the Loran signal from limiter 33 and outputs to data bus 36 the phase advance or delay as binary information (for example, "1" if the output of counter 38 is advanced in phase compared to the Loran signal, and "0" otherwise). Thus, the phase comparator shifts the phase of the sample pulses from counter 38 until they coincide with the leading peaks of the Loran-C carrier wave. A highly stable clock pulse generator 42 produces a clock pulse signal, which is changed by counter 38 (frequency divider) into a pulse signal 39 with a lower frequency.

The Loran-C signal shown in FIG. 5(a) has a repetition period of 99.7 ms in the Loran-C chain in Japan and in its vicinity. In order to facilitate discrimination among master station M and secondary stations $S_1$, $S_2$, a unique phase coding pattern is applied to the pulses groups of alternating cycles of each of the Loran-C signals. A + phase coding in FIG. 5(a) means that the phase of the carrier of the Loran pulses starts positive (+), and a − phase coding means that the phase of the carrier of the Loran signal pulses starts negative (−). The phase coding in the first period of the signal is different from that in the second period, but the same coding pattern is repeated at every two periods to form a unique, identifying pattern.

To limit confusion to the absolute minimum, the following timing nomenclature will be used: the carrier period equals 10 μs, the sample pulse period equals 50 μs, the Loran-C signal pulse width is approximately 200 μs, the Loran pulse period equals 1 ms, the Loran-C signal modulation period equals 99.7 ms, and the sampling period equals 199.4 ms.

Figure 6A:
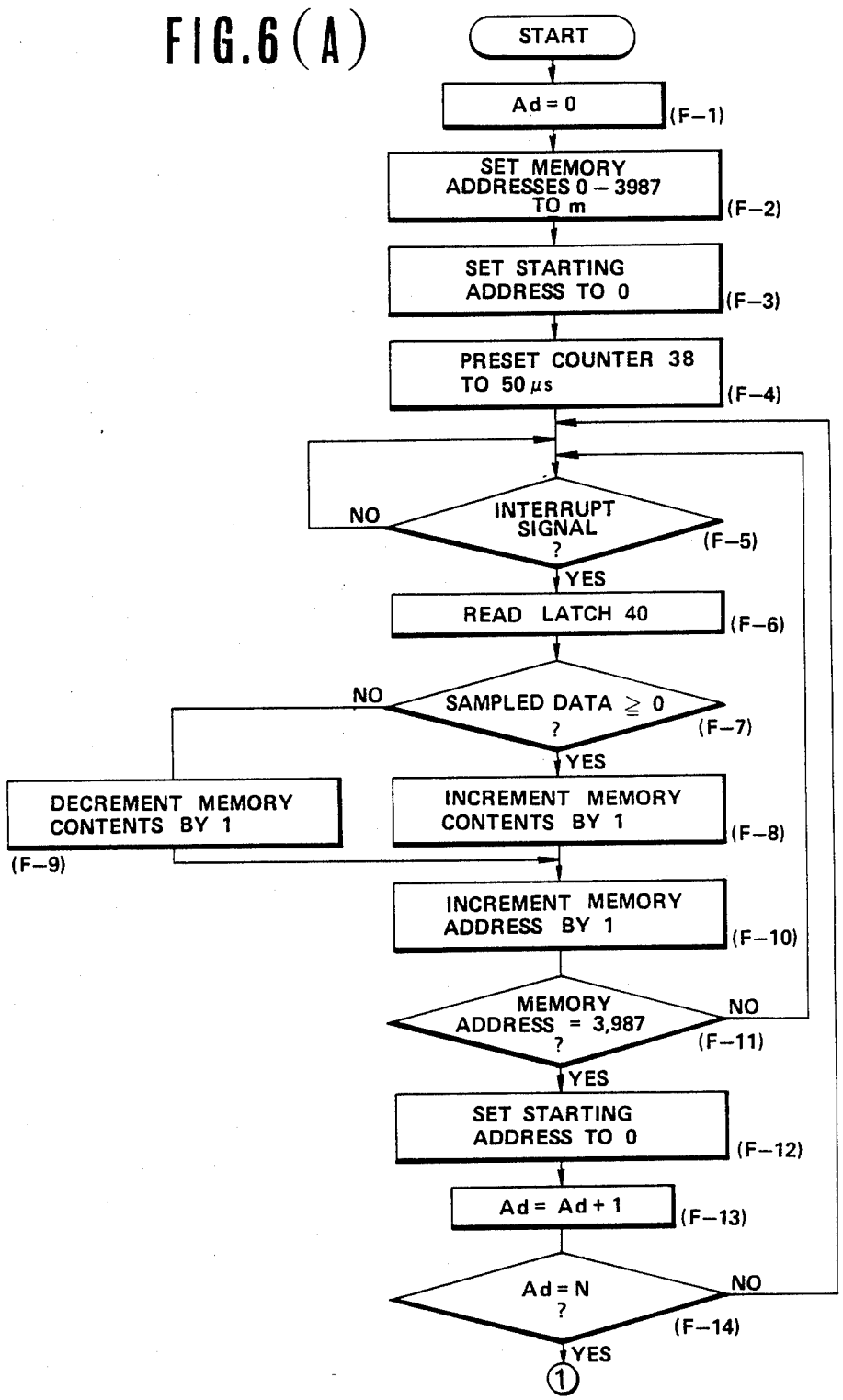
FIG. 6(A) and 6(B) form a flowchart of operation of the apparatus according to the present invention.
Figure 6B:
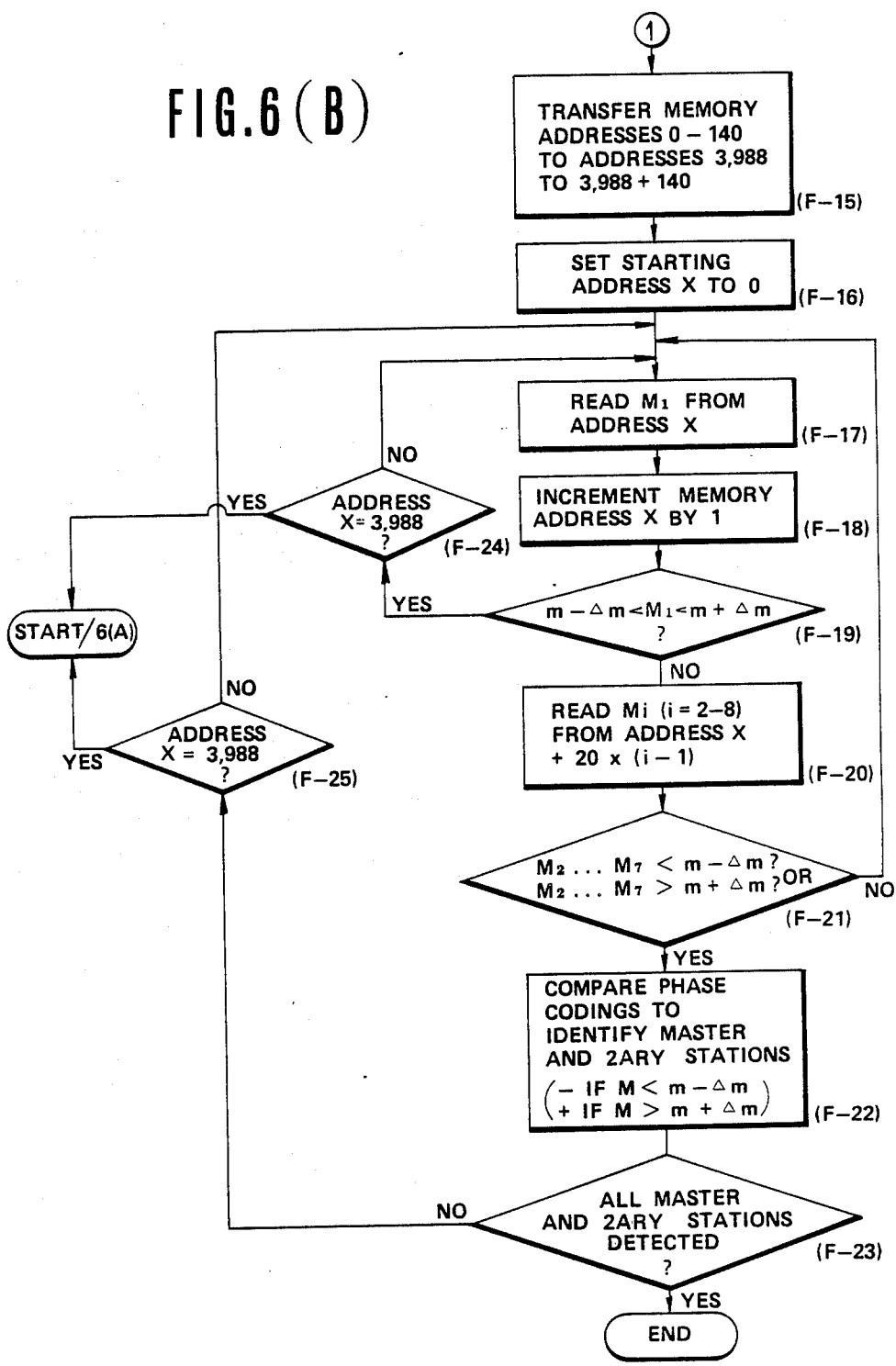

In FIGS. 6(A) and 6(B), after a power supply switch is turned on to initiate detection of Loran-C signal, first, the contents Ad of a period counter, not shown, which may be part of RAM 37 or a separate register is reset at a step (F-1) and CPU 34 sets the contents of addresses 0–3,987 of RAM 37 to a predetermined value m at a step (F-2). Then, the start address at which Loran-C signal data will be stored is determined to be 0 (zero) at a step (F-3) and a value of, for example, 50, depending on the clock frequency, is preset in counter 38 at a step (F-4). As a result, counter 38 produces a sampling pulse SP as output 39 every 50 μs, as shown in FIG. 5(b). The timing of the first sampling pulse SP from counter 38 has no relationship to Loran-C signal modulation period (99.7 ms) but is of course in phase with the carrier period (10 μs) so as to coincide with carrier wave peaks, due to the effect of phase comparator 41. In FIG. 5, one example in which the timing starts at a time point $t_1$ is shown. The sampling pulse SP is inputted to the clock input terminal CK of latch 40. The binary signal of Loran-C signal, i.e. the output of limiter 33, at that time is held by latch 40 and outputted via data bus 36.

Sampling pulse SP is also inputted to interrupt terminal IRT of CPU 34. CPU 34 is responsive to this interrupt input IRT to read the output of latch 40 at a step (F-5) and stores it in RAM 37 at a step (F-6). RAM 37 has sufficient capacity to store sampled data covering two Loran modulation periods, i.e. 99.7×2 ms. In the particular embodiment of FIG. 4, this memory area is 99.7×2 ms/50 μs=3,988 bits. (If one memory cell consisting of 8 bits is used to hold each sample then 3,988 bytes are needed).

The data (the output of latch 40) sampled in response to the $n^{th}$ sampling pulse, where n is from 0 (zero) to 3,987, is stored at an address n of RAM 37. Of course, the memory cells at addresses 0 through 3,987 of RAM 37 have previously been set to m. If the sampled data is "positive", which means that a positive half-cycle portion of the carrier wave of the Loran-C signal is sampled at a step (F-7), "1" is added to the preset value at address n at a step (F-8) while if the sampled data is "negative", which means that a negative half-cycle portion of the carrier wave is sampled at a step (F-7), the preset value at address n is decremented by 1 at a step (F-9).

The same operation is repeated for all of the allocated memory addresses by incrementing the address n by one at step (F-10) and returning from subsequent step (F-11) to step (F-5) until the last (3,987$^{th}$) memory cell has been incremented or decremented. Then the starting address is reset to zero in step (F-12) and then a sampling period counter Ad (not shown) is incremented by one in step (F-13) and checked in step 13 to see if a predetermined number of Loran modulation periods have been sampled. If not, then control is returned to step (F-5) to repeat the sampling process for the next two modulation periods. Execution of this routine through a positive response at a step (F-14) brings about the following memory contents, provided that N is less than m:

(a) If the n$^{th}$ sample pulse coincides with a positive carrier wave pulse, it will do so for every sample period (Ad=1,2,3, ... N). Thus, the memory value at address n is equal to the preset value m incremented by 1 N times, that is m+N.

(b) Similarly, when the n$^{th}$ sample pulse of each sample period coincides with a negatiave carrier wave peak, the contents of address n will be m−N.

(c) On the other hand, sample pulses between Loran modulation pulses will sample only random noise in the receiver and/or external noise. If these are regarded as truly random noise, the probability of the sampled data being "1" or "0" may be considered to be equal. Thus, over a sufficiently large number of sampling periods N, the memory contents will be equally incremented and decremented, leaving the memory value substantially equal to m.

FIG. 5(c) schematically illustrates the memory values derived after N sampling periods in correspondence with FIG. 5(a) and (b). The horizontal axis represents memory addresses up to 3,987 while the vertical axis represents the memory values in the corresponding addresses. In FIG. 5(c), in the absence of a Loran-C pulse, the memory values are substantially equal to the first preset value m, as mentioned above, while where coincident with a Loran pulse, the memory values are m plus or minus N, as shown at 1 - 6 in FIG. 5(c). The areas labelled 1, 2, and 4 - 6 represent the memory values obtained when the sample data of the first of the 8 or 9 pulses constituting a Loran pulse group is "1". That is, if the first pulse is positive, the second and subsequent sampled pulses are "1", provided that they are in phase with the first one, and "0", when they are out of phase with the first one. Conversely, if the first sampled data is "0", the subsequent sampled data will be "0", provided that they are in phase with the first one, and "1", when they are out of phase with the first one, so that the memory value at that time, is as shown at 3 in FIG. 5(c). In either case, the polarity of addition or subtraction is only reversed. Thus, discrimination between the master and secondary stations is easy.

FIG. 7(a) and (c) show the first six Loran pulses M$_1$-M$_6$ of the master station pulse group M on an expanded time scale, along with the corresponding memory values. The waveforms of FIG. 5(a) and FIG. 7(a) represent the output of high-frequency amplifier 32. Since sampling is effected after the carrier wave peaks have been converted by limiter 33 into a square waveform, the noise components form random spikes in the square waveform; they have a constant amplitude and random phase. FIG. 7(c) shows that the memory values in the vicinity of address M and around memory addresses offset by 20 (1 ms/50 μs=20) are either m+N or m−N depending upon the corresponding Loran pulse polarity. As will be seen FIG. 6(B), after N sampling periods, the contents of addreses 0–140 of RAM 37 are transferred to addresses 3,988 thru 3,988+140 at a step (F-15).

FIGS. 5(c) and 7(c) illustrate typical memory values derived when the S/N ratio is relatively high: i.e., the memory values are all offset by exactly plus or minus N, after N sample periods. However as the S/N ratio decreases, the probability of erroneous sampled data increases, so that the final memory values may be somewhat less than m+N or greater than m−N. However, as long as the signal exists, it is statistically clear that the final memory values will necessarily become greater or less than m as N increases.

Returning to FIG. 6(B), the starting memory address is reset to zero in step (F-16).

Next, the contents of the current address X of RAM 37 are read at a step (F-17) and 1 is added to memory address X at a step (F-18). Predetermined values M×Δm are set as threshold values for determination of whether there is a Loran signal: it is determined that there is no Loran signal if the memory values are within m±Δm, while it is determined that there is a Loran signal if the memory values are outside of m±Δm at a step (F-19).

The Loran pulses M$_2$, M$_3$, M$_4$, M$_5$, M$_6$, M$_7$ and M$_8$ correspond to X+20, X+40, X+60, ... X+140 respectively, when X corresponds to the first sampling pulse of Loran pulse M$_1$. If a Loran signal is recognized at a step (F-19), the memory contents M$_2$-M$_8$ are read at a step (F-20). It is then determined whether the read contents M$_2$-M$_8$ are less than m−Δm or greater than m+Δm at a step (F-21), similar to step (F-19). If all of these conditions are satisfied, the phase coding sequence is compared to known identification sequences to determine whether it is a master station or a secondary station. This loop (F-17)-(F-23) is repeated until all of the master and secondary stations are identified at a step (F-23).

If it is determined that the memory value M$_1$ is between m−Δm and m+Δm at a step (F-19), it is determined that there is no Loran signal and the signal detection loop (F-17)-(F-19) is repeated until memory address X reaches 3,988 at a step (F-24). Similarly, if not all of the master and secondary stations have been identified at step (F-23), the detection is repeated until memory address X reaches 3,988 at a step (F-25). When memory address X reaches 3,988 at steps (F-24) and (F-25), the operation returns to START, i.e. step (F-1).

In this way, after N sample periods, CPU 34 can determine the presence and phase coding of the Loran signal. Toward this end, the contents of RAM are checked sequentially, starting with address zero, and the memory addresses corresponding to the timing of Loran pulse groups M, S$_1$, S$_2$, M', S$_1$', S$_2$' of the Loran signals are sought. The time required to check the RAM contents is not excessive and may be about 100 ms if derived from the processing speed of a typical 8-bit microprocessor. After the timing of the Loran pulse groups is recognized, the CPU instructs preset counter 38 to produce sampling pulses synchronously with the master and secondary station pulses for subsequent processing purposes and ends detection of the Loran signals.

As is shown in FIGS. 5(a) and (b), sampling pulses are initially produced at a random point in the Loran signal cycle. However since the Loran signal frequency and modulation characteristics are fixed and well-known, accurately representative data can be obtained by simply sampling over the entire dual-period cycle of modulation.

The present invention is not limited to the embodiment of FIG. 4. As long as an apparatus includes an element capable of holding all of the sampled Loran signal data, the Loran signal can be identified from the accumulated contents.

As described above, in the present invention, a predigitalized Loran-C signal is sampled for a single large period consisting of multiples of two periods of the Loran signal at intervals of tens of $\mu s$ into binary signals, these binary signals are accumulated in memory, and then the time positions of the master and secondary station pulses of the Loran-C signal are detected. Thus, the detection time is greatly reduced (to several seconds) compared to the prior art apparatus. In addition, this process provides an arithmetic mean of the Loran signal levels. For example, if data are sampled N times, the S/N ratio increases by a factor of $\sqrt{2N}$. If $N=13$, then $\sqrt{2N}=\sqrt{265}$, which brings about a 14 dB S/N improvement, thereby greatly improving the S/N characteristics.

While this invention has been described and shown in terms of a preferred embodiment thereof, it will be apparent to those skilled in the art that various modifications and changes of this invention could be made without departing from the scope of this invention as set forth in the attached claims.

What is claimed is:

1. Apparatus for automatically detecting a Loran-C signal having a high-frequency carrier wave and a lower-frequency modulation, comprising:
    (a) first means for sampling the polarity of a received signal at a constant sampling period which is a given multiple of the Loran-C carrier wave period;
    (b) second means, having a plurality of memory cells, one cell assigned to each cycle of said sampling period over at least one modulation period of a Loran-C signal; and
    (c) third means for accumulating said polarities sampled over a plurality of modulation periods of the Loran-C signal in said second means, for reading groups of a fixed number of accumulated polarity values from said second means, the fixed number thereof matching the number of pulses in each Loran-C pulse group and the accumulated polarity values being read from respective memory cells of said second means separated in coincidence with the separation of pulses in each Loran pulse group, and for determining the presence of the Loran-C signal on the basis of the magnitude of accumulated polarity values.

2. Apparatus according to claim 1, wherein one memory cell is assigned to each cycle of said sampling period over at least two modulation periods of the Loran-C signal.

3. Apparatus according to claim 2, wherein every memory cell in said second means is connected for storing a preset value m, and said polarity values are added to existing values in the corresponding cells for a number of modulation periods of the Loran-C signal less than twice the value m.

4. Apparatus according to claim 1, wherein said first means includes a presettable counter means preset to a predetermined value, for counting pulses of a clock pulse signal and producing a sampling pulse when said counter means counts to the predetermined value, and a latch means responsive to the sampling pulse and receiving the received signal for sampling the polarity of same.

5. Apparatus according to claim 3, wherein said third means determines whether the value of each of the memory cells is outside the range of from $m-\mu M$ to $m+\Delta m$, where $\mu m$ is a predetermined positive value smaller than m, to identify that such cells are assigned to a sampling period cycle coincident with a Loran-C modulation pulse.

6. A method of automatically detecting a Loran-C signal consisting of groups of pulses, the groups separated by a modulation period, the polarities of the pulses of each pair of successive groups being modulated, the method comprising the steps of:
    (a) sampling the polarity of a received signal at a constant sampling period;
    (b) over a plurality of modulation periods of the Loran-C signal, the accumulating polarities sampled during a plurality of sampling cycles in a plurality of cells of a memory, each cell corresponding to one cycle of the sampling period during at least one modulation period;
    (c) reading groups of a fixed number of accumulated polarity totals from said memory cells, the fixed number thereof matching the number of pulses in each Loran-C pulse group and the stored polarity totals being read from respective memory cells separated in coincidence with the separation of pulses in each Loran pulse group; and
    (d) determining the presence of the Loran-C signal on the basis of the magnitude of accumulated polarity totals in the memory cells.

7. A method according to claim 6 wherein each of said memory cells is previously set to store a value of an integer m wherein said step of accumulating is repeated over a number of modulation periods of the Loran-C signal less than the integer m.

8. A method according to claim 7, wherein said determining step includes the further step of determining whether the value in each of the memory cells is outside of the range from $m-\Delta m$ to $m+\Delta m$ where $\Delta m$ is a predetermined positive value smaller than m to recognize that such cells correspond to sampling cycles coincident with pulses of the Loran-C signal.

* * * * *